United States Patent
Krick et al.

[11] 3,784,846
[45] Jan. 8, 1974

[54] SOLID STATE MOTOR CONTROLLER FOR DISCONNECTING A MOTOR FROM A POWER SOURCE WHEN A PREDETERMINED UNDERVOLTAGE CONDITION PERSISTS FOR A PREDETERMINED TIME

[75] Inventors: John B. Krick, Joppa; Bernard Coleman, Westminster, both of Md.

[73] Assignee: Rowan Controller, Inc., Westminster, Md.

[22] Filed: Apr. 24, 1972

[21] Appl. No.: 246,610

[52] U.S. Cl............... 307/293, 307/235 R, 317/31, 317/36 TD, 317/141 S
[51] Int. Cl....................... H03k 17/26, H01h 47/18
[58] Field of Search.................. 307/235, 293; 317/31, 36 TD, 33 SC, 141 S

[56] References Cited
UNITED STATES PATENTS

| | | | |
|---|---|---|---|
| 3,688,130 | 8/1972 | Granieri................ | 307/293 X |
| 3,657,603 | 4/1972 | Adams................... | 317/141 S |
| 3,389,325 | 6/1968 | Gilbert.................. | 317/31 X |
| 3,407,338 | 10/1968 | Secunde................ | 317/36 TD |
| 3,541,392 | 11/1970 | Vargo et al........... | 317/36 TD |
| 3,641,397 | 2/1972 | Elliot et al............ | 317/141 S |
| 3,644,793 | 2/1972 | Ilk........................ | 317/141 S |

*Primary Examiner*—Stanley D. Miller, Jr.
*Attorney*—Ostrolenk, Faber, Gerb & Soffen

[57] ABSTRACT

A combination solid state voltage sensing and timing relay employed for disconnecting equipment from a line source when the line voltage drops below a preset voltage for a preset time period. Whereas the pick up voltage of the voltage sensor is fixed at a first level, the drop out voltage is adjustable by means of a variable resistance element to be at a value lying within a range which is just slightly below the pick up voltage at the top of the range to a value which is significantly below the pick up voltage. The time delay interval is adjustable by way of a second variable resistance over a range of the order of from 0.5 to 10 seconds. The output of the undervoltage timer is a single pole normally open solid state switch for selectively connecting or disconnecting the line source from the load, depending upon the condition from the source and the length of time during which this condition persists.

7 Claims, 1 Drawing Figure

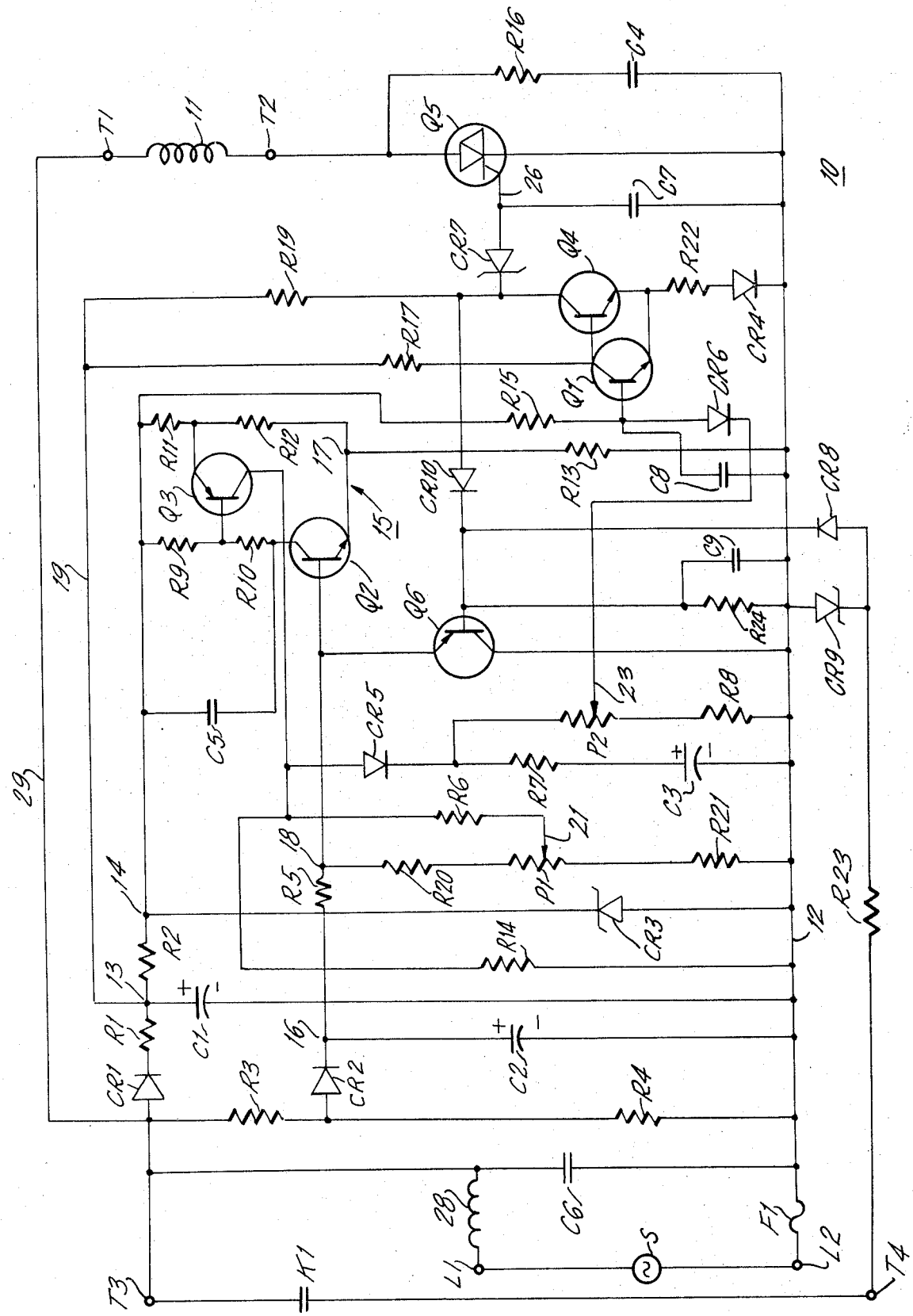

SOLID STATE MOTOR CONTROLLER FOR DISCONNECTING A MOTOR FROM A POWER SOURCE WHEN A PREDETERMINED UNDERVOLTAGE CONDITION PERSISTS FOR A PREDETERMINED TIME

The present invention relates to control circuits and more particularly to a novel undervoltage timer of solid state design adapted to couple a load to a source when the line voltage achieves a predetermined pick up level and to decouple the load from the source when the output of the source falls below a predetermined, but adjustable drop out level for a predetermined but adjustable time period.

BRIEF DESCRIPTION OF THE INVENTION

The present invention is characterized by providing an undervoltage timer of solid state design which is adapted to disconnect electrical equipment from the line voltage when the output of the line voltage drops below a preset voltage for a preset time period. Whereas pick up voltage is fixed, drop out voltage and the time delay interval are adjustable over substantially broad ranges.

The solid state timer is comprised of a solid state output switch which couples the line source to the load. When an initiating contact means is closed (either momentarily, i.e., for a 10 millisecond minimum or continuously) the normally opened solid state output switch closes to energize the load if line voltage is above the preset pick up level or, alternatively, will remain open if the line voltage is below the pick up level. Once pick up conditions are satisfied, the normally open solid state output switch closes and remains closed until the voltage drops below the preset drop out voltage level. The preset time delay is initiated within 30 milliseconds after the voltage drops below the preset level. During the time delay period, the solid state output switch remains closed as long as the line voltage remains above a predetermined level which, in one preferred embodiment is 50 volts RMS. The external load contactor may either remain closed or open depending on the contactor drop out characteristics and the line voltage during the time delay period. If the line voltage is not returned to the pick up voltage within the preset time delay period, the solid state switch will open to de-energize the load. However, if line voltage recovers to the preset pick up level after the time delay has elapsed, the normally open solid state output switch will remain open until the initiating contact is reclosed.

OBJECTS OF THE INVENTION

It is therefore one primary object of the present invention to provide a novel undervoltage timer comprised of solid state elements which is adapted to couple a load to a voltage source when a predetermined pick up level is achieved, to disconnect the load from the source if the source falls below a predetermined adjustable drop out level and remains below this level for a predetermined, but adjustable time period and to prevent reclosing of the solid state output switch after it has opened until an initiating contact switch is again operated.

BRIEF DESCRIPTION OF THE DRAWING

The above as well as other objects of the present invention will become apparent when reading the accompanying description and drawing in which:

The sole FIGURE is a schematic diagram showing an undervoltage timer embodying the principles and concepts of the present invention.

DETAILED DESCRIPTION OF THE DRAWING

The sole FIGURE is a schematic diagram showing an undervoltage timer and relay 10 formed of solid state components and having input terminals L1 and L2 coupled to a line source S which may, for example, be a 120 volt line source +10 percent −15 percent, having a frequency of either 60 or 50 Hz. The output terminals T1 and T2 are connected across a load 11 which is selectively coupled to source S in a manner to be more fully described.

A non-regulated D.C. power supply comprised of series connected diode CR1, resistor R1 and capacitor C1 function as a half wave rectifier and filter, to provide a source of unregulated D.C. voltage for operating the timing, sensing and output circuits.

In order to achieve the desired sensing and timing accuracy over the line voltage and operating temperature range, the timing circuit requires a regulated supply voltage. This regulated voltage source consists of a zener diode CR3 coupled between common bus 12 and one terminal 14 of resistor R2 which is coupled to resistor R1 to provide a regulated D.C. supply at output terminal 14.

VOLTAGE SENSING CIRCUIT

The voltage sensing circuit 15 comprises a complementary Schmitt Trigger (CST) having transistors Q2 and Q3 and a tracking voltage source comprised of resistors R3 and R4 connected in series across terminals L1 and L2 and series connected diode CR2 and capacitor C2 connected in parallel across resistor R4. The tracking voltage output appears at terminal 16 which is the common terminal between CR2 and C2. The voltage sensing circuit is further comprised of a voltage divider network which includes resistor R5 having one terminal coupled to terminal 16 and series connected resistors R20, potentiometer P1 and resistors R21 connected between the remaining terminal of resistor R5 and common bus 12.

An initiating contact K1 is coupled across timer terminals T3 and T4. When source S is providing an output at the level of the pick-up value and before closure of contact K1, the series circuit of resistors R11, R12 and R13 apply a reference voltage developed at the common terminal 17 between resistors R12 and R13 to the emitter of Q2. The tracking voltage supply source whose output is at terminal 16 develops a voltage which is reflected through the voltage divider comprised of resistors R5, R20, P1 and R21 to develop a voltage at the common terminal 18 between resistors R5 and R20 which is applied to the base electrode of Q2 and which is slightly higher than the emitter voltage appearing at terminal 17 tending to turn Q2 on. However, since the initiating contact K1 is open, emitter follower transistor Q6 is biased into the conducting state through a bias resistor R24 connected to common bus 12. With the emitter of Q6 being coupled to the base of Q2, when Q6 is in the conducting condition, the base voltage Q2 is clamped to a level below the level at terminal 17 to prevent the CST from switching on. Once the initiating contact K1 is closed, a clipped half sine wave is developed across Zener diode CR9 due to the current flow from terminal T4 through R23. This level is coupled to the base of Q6 through diode CR8. This voltage level causes Q6 to momentarily switch off allowing the voltage at the base of Q2 to swing up to the level established at terminal 18 which is sufficient to turn Q2 and hence the CST on.

The output of the CST circuit (i.e. transistor Q3) is:
1. fed to fixed load resistor R14 to provide the required hysteresis for the CST circuit;
2. fed through diode CR5 and resistor R7 to charge timing capacitor C3 to its output charging level and simultaneously to switch the normally open solid state switch Q5 on; and
3. fed through R6 to the wiper arm 21 of potentiometer P1 as a positive feedback to function in conjunction with the natural hysteresis of the complementary Schmitt Trigger (CST) to provide a hysteresis effect equivalent to the order of 3 volts RMS line voltage (with a voltage potentiometer set for the maximum drop out voltage) and feedback from the gate circuit output Q4 is fed back to the base of Q6 through diode CR10 and Zener CR7 to maintain Q6 in the off condition.

The CST develops internal hysteresis due to he voltage divider effect of resistors R11, R12 and R13 in conjunction with transistor Q3. With the CST off, transistor Q3 remains off and the voltage at the emitter of Q3 is of the order of 18 volts. However, once the CST switch is on, Q3 turns on and the voltage at the emitter of Q3 drops by approximately 2 volts due to the current flow through Q3 to supply the three branch circuits described above. This voltage drop is reflected to the emitter of Q2 as a fraction of a volt decrease in voltage level causing a snap action in the CST circuit whereby both transistors Q2 and Q3 are caused to saturate.

The complementary Schmitt trigger will remain in the "on" state as long as the line voltage remains above the preset drop out voltage. If the line voltage decreases, the tracking voltage supply D.C. output developed across capacitor C2 will also decrease and as a result, the voltage at the base of Q2 (which is a sum of the fixed D.C. input to the complementary Schmitt trigger through R6 and dividers P1, R20 and R21 plus the variable voltage from the tracking supply through resistor R5) will decrease to a point where the loop gain of transistors Q2 and Q3 drops below unity causing the complementary Schmitt trigger to reset to the "off" condition. Transistor Q3 now returns to the blocking state and removes drive from the timing circuit through CR5, thereby initiating the time delay interval and the voltage sensing divider circuit through R6 so as to reset the turn-on threshold to its preset value.

TIMING CIRCUIT

During the time that the complementary Schmitt trigger is on, transistor Q3 is conducting to rapidly charge timing capacitor C3 through transistor Q3, diode CR5 and resistor R7. Once the line voltage drops below the drop out adjustment and the complementary Schmitt trigger turns off, the timing capacitor begins to discharge exponentially through voltage divider R7, time delay adjustment potentiometer P2 and resistor R8. The time required for the timing circuit voltage to decay completely is a constant and is approximately equal to five times RC where R= the sum of resistors R7, P2 and R8 and C is equal to the capacitance of capacitor C3. However, the time delay period is adjustably determined by the adjustment of the adjustable arm 23 of potentiometer P2 which determines how long the voltage at the wiper arm 23 (which is the input to the Schmitt trigger circuit comprised of transistors Q1 and Q4) will remain above a predetermined voltage level during the exponential decay. If the line voltage returns to its predetermined pick-up level or above prior to the voltage at the input to the Schmitt trigger comprised of transistors Q1 and Q4, decaying to a value below its threshold level, the complementary Schmitt trigger (CST) circuit will be enabled to turn on since transistor Q6 will be maintained off due to feedback from output switch Q4 through diode CR10. However, if the line voltage returns to pick up value or above after the voltage at the input to the Schmitt trigger transistor Q1 decays below its threshold level, the complementary Schmitt trigger will be inhibited from turning on since transistor Q6 will now conduct and can only be reset by closure of the initiating contact K1.

OUTPUT CIRCUIT

The output circuit consists of a Schmitt Trigger circuit comprised of transistors Q1 and Q4 and a solid state output switch Q5 which preferably is a triac. The Schmitt Trigger output transistor Q4 functions as a switch to control current flow to the gate 26 of Q5. During the time that timing capacitor C3 is discharged, the input to the Schmitt Trigger is approximately zero volts. Transistor Q1 remains off, allowing current to flow from the unregulated D.C. supply (terminal 13 through lead 19 and resistor R17 to the base of Q4) causing Q4 to saturate, diverting current away from gate 26 of Q5 and through Q4, resistor R22 and diode CR4 to ground.

Once the complementary Schmitt Trigger switches on to charge timing capacitor C3, a voltage is developed at the wiper arm 23 to potentiometer P2 of sufficient magnitude for any setting of the wiper arm to trigger Q1 on. Transistor Q1 turns on and saturates, diverting base drive away from the base of transistor Q4 so as to turn Q4 off. During this period of time, the current flows from terminal 13 of the unregulated D.C. supply through lead 19, resistor R19 and zener diode CR7 to the gate 26 of Q5 causing Q5 to conduct and thereby establish a closed circuit path between source S, common bus 12, switch Q5, load 11 and lead 29 back to source S. Resistor R22 functions to provide hysteresis for the Schmitt Trigger circuit comprised of transistors Q1 and Q4.

The resistor-capacitor network R16 and C4 connected in series fashion and coupled across Q5 function as a snubber to reduce the commutated $dv/dt$ to less than 1 volt per microsecond to insure that the triac will not re-trigger due to rate effect.

TRANSIENT SUPPRESSION CIRCUITRY

The transient suppression circuitry consists of the LC filter network comprised of RF choke 28 and capacitor C6 as well as suppression network R16–C4 and output driver and triac gate bypass capacitors C8 and C7, respectively. The LC network functions to reduce transient levels from approximately 1,500 volts peak-to-peak to less than 400 volts which is the maximum blocking voltage of triac Q5 and further functions in conjunction with R16-C4 to reduce the blocking $dv/dt$ to less than 1 volt per microsecond to prevent rate triggering of the triac.

Capacitors C7 and C8 are used to bypass conductor RF1 around the output driver (the Schmitt Trigger comprised of Q1 and Q4) and the triac gate Q5 to prevent transient triggering. Additional bypass or rate slowdown capacitors C5 (in the complementary Schmitt Trigger circuit) and C9 (in the Q6 circuit) to prevent RF1 triggering of these circuits.

FUSING

The timer contains an ultrafast current limiting fuse F1 coordinated to prevent damage to the normally open solid state output switch triac Q5 due to either short circuit conditions in the external load circuit or current surges resulting from high voltage transients being impressed upon the 120 volt timer input.

It can be seen from the foregoing description that the present invention provides a novel solid state electronic timer for preventing the coupler of a source to a load until a predetermined pick up level is achieved, for disconnecting the load from the source when the source output drops below a particular adjustable drop out voltage level and persists in this condition for a predetermined but adjustable time period, and for preventing reconnection of the load to the source until reclosure of the initiate contacts which must occur after the load has been disconnected from the source.

Although these has been described a preferred embodiment of this novel invention, many variations and modifications will now be apparent to those skilled in the art. Therefore, this invention is to be limited, not by the specific disclosure herein, but only by the appending claims.

What is claimed is:

The embodiments of the invention in which an exclusive privilege or property is claimed are defined as follows:

1. A solid state timer for selectively coupling an a.c. power source to a load only when the power source achieves a predetermined pick-up voltage and for decoupling said source from said load when the level of said source drops below a predetermined drop-out voltage for a predetermined time period, said timer comprising:

first means coupled to said source for generating a regulated d.c. output;
tracking means coupled to said source for developing a d.c. voltage level representative of and sensitive to changes in the output level of said source;
a timing circuit including a capacitor;
a solid state switch coupled between said source and said load, said switch having a gate electrode for selectively controlling the conductive state of said switch;
a control circuit powered by said first means and having an input coupled to said tracking means and having an output, said output coupled to said timing circuit;
a gate circuit coupled between said timing capacitor and the gate electrode of said solid state switch for turning said solid state switch on when said gate circuit is turned off, said gate circuit being turned off when said capacitor discharges below a predetermined level;
said control circuit being turned on when the output of said tracking means reaches a predetermined level whereby said control circuit charges said capacitor;
said gate circuit being turned off when said capacitor is charged to a predetermined level;
a clamping circuit having an output coupled to the input of said control circuit for enabling said control circuit to be turned on only when the clamping circuit is not conducting;
second normally operable switch means connected between said source and the input of said clamping circuit, said second switch means having an open position for uncoupling said clamping circuit from said source and a closed position for coupling said source to said clamping circuit;
said clamping circuit being turned on when said switch means is in the closed position to disable said control circuit;
feedback means coupled between the said gate circuit output and the input of said clamping circuit for maintaining said clamping circuit in the nonconductive state when said solid state switch is turned on and for turning on said clamping circuit when said solid state switch is turned off to prevent operation of said control circuit until said second switch means is reclosed.

2. The solid state timer of claim 1 further comprising an adjustable potential divider circuit coupled between the output of said second means and the input of said control circuit for adjustably controlling the level of the portion of the output of said second means coupled to the input of said control circuit to adjustably control the pick-up voltage level.

3. The solid state timer of claim 1 wherein said timing circuit is further comprised of adjustable voltage divider means for coupling a portion of the output of said timing circuit to said second switch means to adjustably regulate the elapsed time at which said second switch means is turned off as said capacitor is discharging.

4. The solid state timer of claim 1 further comprising means coupled between said second switch means and the input of said clamping circuit for coupling a half-wave rectified d.c. signal to the input of said clamping circuit to turn said clamping circuit off when said second switch means is in said closed position.

5. A solid state timer for selectively coupling an a.c. power source to a load only when the power source achieves a predetermined pick-up voltage and for decoupling said source from said load when the level of said source drops below a predetermined drop-out voltage for a predetermined time period, said timer comprising:

first means coupled to said source for generating a regulated d.c. output;
tracking means coupled to said source for developing a d.c. voltage level representative of and sensitive to changes in the output level of said source;
a timing circuit including a capacitor;
a solid state switch coupled between said source and said load, said switch having a gate electrode for selectively controlling the conductive state of said switch;
a control circuit powered by said first means and having an input coupled to said second means and having an output, said output coupled to said timing circuit;
a gate circuit coupled between said timing capacitor and the gate electrode of said solid state switch for turning said solid state switch on when said gate circuit is turned off, said gate circuit being turned off when said capacitor discharges below a predetermined level;

said control circuit being turned on when the output of said tracking means reaches a predetermined level whereby said control circuit charges said capacitor;

said gate circuit being turned off when said capacitor is charged to a predetermined level;

a clamping circuit having an output coupled to the input of said control circuit for enabling said control circuit to be turned on only when the clamping circuit is not conducting;

second normally operable switch means connected between said source and the input of said clamping circuit, said second switch means having an open position for uncoupling said clamping circuit from said source and a closed position for coupling said source to said clamping circuit;

said clamping circuit being turned on when said switch means is in the closed position to disable said control circuit;

feedback means coupled between the said gate circuit output and the input of said clamping circuit for maintaining said clamping circuit in the nonconductive state when said solid state switch is turned on and for turning on said clamping circuit when said solid state switch is turned off to prevent operation of said control circuit until said second switch means is reclosed;

said control circuit comprising:

a complementary Schmitt trigger circuit including complementary type transistors; the base of one of said transistors being coupled to the output of said second means, the collector of the other one of said transistors being coupled to said timing circuit.

6. A solid state timer for selectively coupling an a.c. power source to a load only when the power source achieves a predetermined pick-up voltage and for decoupling said source from said load when the level of said source drops below a predetermined drop-out voltage for a predetermined time period, said timer comprising:

first means coupled to said source for generating a regulated d.c. output;

tracking means coupled to said source for developing a d.c. voltage level representative of and sensitive to changes in the output level of said source;

a timing circuit including a capacitor;

a solid state switch coupled between said source and said load, said switch having a gate electrode for selectively controlling the conductive state of said switch;

a control circuit powered by said first means and having an input coupled to said second means and having an output, said output coupled to said timing circuit;

a gate circuit coupled between said timing capacitor and the gate electrode of said solid state switch for turning said solid state switch on when said gate circuit is turned off, said gate circuit being turned off when said capacitor discharges below a predetermined level;

said control circuit being turned on when the output of said tracking means reaches a predetermined level whereby said control circuit charges said capacitor;

said gate circuit being turned off when said capacitor is charged to a predetermined level;

a clamping circuit having an output coupled to the input of said control circuit for enabling said control circuit to be turned on only when the clamping circuit is not conducting;

second normally operable switch means connected between said source and the input of said clamping circuit, said second switch means having an open position for uncoupling said clamping circuit from said source and a closed position for coupling said source to said clamping circuit;

said clamping circuit being turned on when said switch means is in the closed position to disable said control circuit;

feedback means coupled between the said gate, circuit output and the input of said clamping circuit for maintaining said clamping circuit in the nonconductive state when said solid state switch is turned on and for turning on said clamping circuit when said solid state swtich is turned off to prevent operation of said control circuit until said second switch means is reclosed; said switch gate circuit being comprised of a Schmitt trigger circuit having first and second transistors; impedance means coupled between said first means and the gate electrode of said solid state switch; said first transistor being coupled to said timing circuit and being turned on when the charge across said capacitor reaches a predetermined level, said second transistor being coupled to said first transistor and being turned off when said first transistor is turned on to shunt current passing through said impedance means away from the gate electrode of said solid state switch to render said solid state switch nonconductive when the output of said timing circuit has fallen below a predetermined level.

7. The solid state timer of claim 2 further comprising resistance means coupled to said adjustable potential divider circuit and the input of said control circuit for maintaining said control circuit in the on state once said control circuit is turned on.

* * * * *